(12) United States Patent
Mallon et al.

(10) Patent No.: US 9,220,934 B2
(45) Date of Patent: Dec. 29, 2015

(54) WATER USAGE DATA ACQUISITION, PROCESSING AND PRESENTATION FOR FIRE APPLIANCES

(75) Inventors: John Mallon, Kenagh (IE); Tim Carew, Portlaoise (IE)

(73) Assignee: TSI Flowmeters Ltd., Portlaoise (IE)

( * ) Notice: Subject to any disclaimer, the term of this patent is extended or adjusted under 35 U.S.C. 154(b) by 841 days.

(21) Appl. No.: 13/303,990

(22) Filed: Nov. 23, 2011

(65) Prior Publication Data

US 2012/0132445 A1    May 31, 2012

(30) Foreign Application Priority Data

Nov. 23, 2010   (GB) .................................. 1019840.6

(51) Int. Cl.
| | | |
|---|---|---|
| *A62C 27/00* | (2006.01) | |
| *A01G 25/16* | (2006.01) | |
| *A01G 25/09* | (2006.01) | |
| *B05B 12/00* | (2006.01) | |
| *A01M 7/00* | (2006.01) | |
| *A62C 35/58* | (2006.01) | |
| *E02F 9/20* | (2006.01) | |
| *G01F 15/06* | (2006.01) | |
| *G01F 15/075* | (2006.01) | |

(52) U.S. Cl.
CPC .............. *A62C 27/00* (2013.01); *A01G 25/09* (2013.01); *A01G 25/16* (2013.01); *A01M 7/0082* (2013.01); *A01M 7/0089* (2013.01); *A62C 35/58* (2013.01); *B05B 12/00* (2013.01); *E02F 9/2025* (2013.01); *G01F 15/06* (2013.01); *G01F 15/063* (2013.01); *G01F 15/075* (2013.01)

(58) Field of Classification Search
CPC ........ A01G 25/16; A01G 25/09; B05B 12/00; A01M 7/0082; A01M 7/0089; A62C 35/58; A62C 27/00; E02F 9/2025; G01F 15/06; G01F 15/063; G01F 15/075
USPC ........... 169/13, 16, 24; 239/69, 172; 700/282, 700/283; 701/50
See application file for complete search history.

(56) References Cited

U.S. PATENT DOCUMENTS

| | | | | |
|---|---|---|---|---|
| 3,974,879 | A | | 8/1976 | Nelson, Jr. et al. .............. 169/43 |
| 5,174,383 | A | * | 12/1992 | Haugen et al. ................... 169/13 |
| 6,085,586 | A | | 7/2000 | Arvidson et al. ................ 73/201 |
| 6,886,639 | B2 | * | 5/2005 | Arvidson et al. ............... 169/24 |
| 6,938,829 | B2 | * | 9/2005 | Doherty et al. .................. 239/69 |
| 7,104,334 | B2 | * | 9/2006 | Thompson ....................... 169/16 |
| 7,703,543 | B2 | * | 4/2010 | Waters et al. .................... 169/13 |
| 2007/0246230 | A1 | * | 10/2007 | Roberts ............................ 169/13 |

FOREIGN PATENT DOCUMENTS

| | | |
|---|---|---|
| EP | 1 411 329 A2 | 10/2003 |
| JP | 2004261509 | 9/2004 |
| JP | 2005230524 | 9/2005 |
| KR | 20050003740 | 1/2005 |
| KR | 100687023 | 2/2007 |

OTHER PUBLICATIONS

Search Report for corresponding GB Application No. GB1019840.6, dated Mar. 12, 2012, 2 pages.

* cited by examiner

*Primary Examiner* — Steven J Ganey
(74) *Attorney, Agent, or Firm* — Seed IP Law Group PLLC

(57) ABSTRACT

The present application is directed to fire fighting appliances. The application provides a system for recording flows on a fire appliance to address deficiencies in the prior art where such information is only analysed during an event.

12 Claims, 6 Drawing Sheets

WATER USAGE DATA ACQUISITION, PROCESSING AND PRESENTATION FOR FIRE APPLIANCES

FIELD

The present application relates to the field of fire tenders and water management.

BACKGROUND

A Fire and Rescue Service (FRS) is an organisation with responsibility for managing and co-ordinating the response to fires and emergencies within a defined geographical territory, for example a county or a city. An FRS is typically managed by a Chief Fire Officer (CFO), several senior managers at DCFO, ACO and Commander level, divisional officers, station managers, station officers and fire fighters. Fire stations are strategically located throughout the territory so that FRS resources may be deployed in the speediest manner to attend to a fire or other incident. Each fire station may have one or more fire appliances and a number of additional support appliances. In turn, each fire appliance is staffed by a fire crew. Each fire crew is assigned a call sign for the purposes of identification. A busy fire station may have up to three fire crews working the same fire appliance at different times of the day.

A fire appliance 1 (fire truck, fire tender, pumper, and several other names), as shown in FIG. 1, is a motorized vehicle used to transport personnel, water and fire-fighting equipment to the scene of a fire. The fire appliance engine is used to drive the vehicle from the fire station to the scene of the fire. Upon arrival at the scene of the fire, the appliance is parked and the engine transmission is transferred to drive the fire pump, generally though a Power Take Off coupling (PTO). This action is referred to as 'PTO engage'.

A fire appliance has an internal water tank 4 (typically 1,800 litres capacity), an internal pump 6 is driven by the appliance engine to pressurize the water, hoses 8 to direct the water from the pump to the fire and branches 10 (nozzles) to attach to the end of the hoses 8 to direct water onto the fire as depicted in FIG. 2. A fire crew assigned to a fire appliance consists of a manager (Operational Incident Commander—OIC), a pump operator/driver and several branch operators/branchmen. The OIC or pump operator has access to a number of indicators and controls in the pump bay 16. A number of connections are available in the pump bay 16 to allow for taking in water, utilizing the pump 6 or providing water directly into the appliance tank 4. The pump operator also has local access to the engine speed to modify the PTO rotational speed.

Most water used for fire-fighting in town and city areas comes from the water distribution network through fire hydrants. The fire appliance may connect a hose directly to the fire hydrant or through a relay system with one or more fire appliances when the distance between the fire and the hydrant is large. A water carrier may also be used to ferry water taken from the water distribution system to the scene of the fire. Open source water supplies are used where access to the water distribution network is impracticable. Open source water includes rivers, lakes, the sea, canals, swimming pools, etc. The fire appliance tank is typically re-filled after use (at a fire) by connecting to the water distribution network using a fire hydrant. The water supply from a fire hydrant is pressurized and the fire appliance may not be powered on while the tank is being refilled.

In addition to the delivery of water, fire-fighting foam can also be added to water to increase the fire extinguishing capability of the water being delivered onto the fire. Foam is added to water at various percentages ranging from 0.1% to 6% depending on the type of foam and the accelerants in the fire. Establishing the correct ratio of foam to water is critical for making a foam mixture that is efficient for extinguishing fires.

The number and type of outlets available from a fire appliance depends on the type of pump. A single stage pump will have low pressure (0 to 16 bar pressure) outlets only. The dual stage pump is more typical in the British Isles and has high pressure outlets (25 to 40 bar) in addition to the low pressure outlets. The number of low pressure outlets is usually between two and four though specialist appliances can have six or more. The number of high pressure outlets is usually two, one for each side of the appliance. A newer type of pump is a triple stage pump which has low pressure outlets, high pressure outlets and medium pressure outlets to drive water up a ladder platform to supply large volumes of water through a monitor.

Fire-fighting technology traditionally consists of a pump pressure gauge to assist the pump operator control the delivery of water to one or more branchmen, i.e.: fire-fighters holding the branch at the end of the fire hose and directing water onto the fire. The pressure gauge displays the pump pressure (PP) and the engine speed can be controlled to adjust the pump pressure to obtain a suitable branch pressure. The pump operator must take friction loss and pressure loss due to the branch location into account. Therefore, to achieve the optimum performance of fire fighting branches, and with regard to the safety of branchmen, pump operation requires the estimation of a number of hydraulic losses. These include knowledge of pressure loss through hydraulic friction in hose lines, losses introduced depending on the way the hoses are laid out (bends, etc), static head loss and the characteristics of certain types of equipment such as dividing breeches and inductors. The interaction of all these factors affects the pump operator's ability to estimate and maintain branch pressure(s) appropriate to the type and relative position of equipment in use. Using a simple pressure gauge in this way, estimates of flow rate are determined very approximately, by the mental application of simple formulae, or reference to tables, based on a pressure/flow relationship in the case of a simple type 'A' branch of a specific diameter. This principle is not readily applicable to specialized foam equipment, jet/spray branches or monitors of varying complexity.

Thus, the pressure approach is considered an approximation at best and does not guarantee the optimum flow for any given branch. FRS's continually strive to improve the way in which they deliver their service to the public and new technology has been adopted in many areas. Branch technology is continually developing and new branches are designed to work most effectively at specific flow rates. Hence, water delivered onto any fire may not be the most efficient or effective, which could result in outcomes such as incidents taking longer to extinguish, greater run-off of contaminated water entering water courses, more carbon emissions entering the atmosphere due to the fires burning for longer and more resources being required at incidents for water management.

Specifically, pressure-based measurement of branch water has been shown to have a number of fundamental flaws. Firstly, there is no direct way of measuring how much water is being delivered at the branch for any given pressure set at the pump. For example, a pump pressure gauge could be showing 4 bar being delivered by the pump but the branch may not be delivering any water at all (due to a number of reasons such as branch shut-down, debris/vehicles fully restricting hose lines, debris blocking the branch). Secondly, with the pressure driven approach, the same pressure conditions are established at the pump for all branches even though the water flow rate and pressure requirements for each branch may vary widely. It is difficult to create the optimum operating conditions for each branch. Furthermore, there is the requirement, for safety reasons, to establish operating conditions for the branchmen with the lowest operating pressure requirement, thereby limiting the effectiveness of other branchmen and the effectiveness of water usage.

To address some of these issues a number of solutions are outlined in the prior art. U.S. Pat. No. 3,974,879 outlines a system for delivering constant water flow rates to an outlet by adjusting the position of the valve in response to a changes in output pressure of the pump and pressure drop in the hose. KR20050003740 outlines a similar system for a fire truck where the water discharge rate and pressure are controlled to automatically apply in fire situations. JP2004261509 describes a pressure control valve to control the pressure of fire extinguishing fluid sent to a pump for application to the fire. However these approaches do not readily address all problems.

The most efficient solution to these problems has seen the increased use of flow meters on fire pumps. Using the information provided by flow meters, the pump operator can establish the optimum operating conditions for each and every branchmen, i.e.: the correct flow rate and pressure rating for the branch being used by the operator. This greatly enhances the safe working conditions of branchmen. A flow meter shows the number of litres per minute being delivered by the pump and (as water is virtually incompressible) which is the same as the flow actually being delivered at the branch. Placing a flow sensor on the incoming supply pipe work informs the operator of how much water is available for fire-fighting. Having knowledge of the incoming water supply, the pump operator can observe any changes and react accordingly to ensure his branch operators have sufficient water supply, are safe or can take action if conditions merit it, and facilitates the best use of water resources. Any changes to the incoming supply can immediately be identified and reported to the Operation Incident Commander (OIC) who can then adjust his/her fire-fighting strategy accordingly. For example, were the incoming supply to halve in volume, the OIC could withdraw one or more of his fire fighters from potentially dangerous situations.

Many FRS's work their pumps by filling the tank from the hydrant supply (using hydrant pressure to fill the tank) while suctioning water from the tank to deliver the branchmen. One of the pump operator's key tasks is to ensure a continuous supply of water to his branchmen, moreover to ensure water supplies do not run out while extinguishing the fire. Without a clear indication of flow rate of incoming supply and of flow rates being delivered to branchmen, the pump operator does not have the means to properly monitor and therefore control water supplies. The out-going flow rate can exceed the incoming flow rate, eventually leading to the tank running dry and branchmen being left without water in the face of a raging fire.

U.S. Pat. No. 6,085,586 and JP2005230524 describe systems where flow sensors and displays are used to present flow summary flow information to the user. In this way, a user may identify the total flow being delivered to a fire by an appliance. KR100687023 describes an alarm type system that identifies water volume contained in a fire engine tank with a sensor.

The present application is directed at improving prior art flow measurement systems in fire appliances.

SUMMARY

As outlined above, flow meter equipped appliances offer many benefits to the pump controller, incident commander and branchmen. However, the focus on most of the prior art has been on instantaneous feedback to the pump operator on a display around the pump bay. The present application improves upon this process by realizing that significant benefit may be gained not alone by displaying flows but creating and storing records of flow for an incident and providing this information remotely to others. In this way, an accurate picture of the history of the incident may be obtained.

Accordingly, a first embodiment provides an automated method of recording a flow event on a flow recording system on a fire appliance, the method comprising the steps of:

a) detecting a signal indicative of a start condition for a flow event;

b) obtaining a measurement of flow from a flow sensor on the fire appliance;

c) for each obtained measurement detecting whether a measured flow exceeds a pre-determined threshold;

d) establishing a flow record for the measured flow where it exceeds the pre-determined threshold;

e) updating the flow record as long as the measured flow exceeds the pre-determined threshold;

f) ending a flow record when the measured flow falls below the pre-determined threshold; and g) repeating steps b through f whilst a start condition remains present.

The start condition may be one of one of i) detection of a signal indicating pump activation, or ii) detection of flow on a line not driven by the pump.

Each recorded flow event may include one or more of the following:

a) the start time, b) end time, c) position of the fire appliance as determined from a positioning system, d) an identifier for the fire appliance.

Individual flow records within a flow event may include one or more of the following: a) the start time of the flow record; b) the sensor (e.g.: outlet\inlet) associated with the flow record; c) the total volume for the flow record; d) instantaneous flow at instants in time; e) the end time of the flow record.

Optionally, the flow events may be uploaded to a server.

Flow events may be aggregated together at the server to provide a measure of a parameter over time or at an incident. Information may be aggregated for individual fire appliances. The aggregate information is directed to one of the following: a) pump activity; b) pumped volume; c) pump idling; and d) individual branch usage.

The method may further comprise the calculation of tank volume consumption values for a fire appliance for each flow event.

In a second embodiment, a fire appliance vehicle is provided comprising at least one pump for delivering a fluid from a pump bay, suitably water, to a fire, the fire appliance further comprising a flow recording system. The flow recording system suitably comprises: a controller having at least one local interface for interfacing with devices locally on the fire appliance; at least one flow meter for measuring the flow of water being delivered to an outlet of the fire appliance, the flow meter being configured to provide this flow information to the controller via the at least one interface; wherein the controller is configured to obtain a measurement from the at least one flow meter on a periodic basis, and to store the at least one measurement and the time of the measurement; and wherein the pump bay provides at least one display for displaying an aggregated flow. The controller may be configured to estimate a volume of fluid delivered past the at least one flow meter by integrating the measured flow rates over the respective time intervals between measurements. The controller may be responsive to the detection of one or more events to initiate the recording of data from the at least one sensor. The fire appliance vehicle may comprise a display for displaying measured flow information to the pump operator. The controller may be configured to detect a predetermined condition and to cause an alarm to be presented to the pump operator on the occurrence of said alarm. The fire appliance vehicle may further comprise a positioning system identifying the position of the fire appliance vehicle, wherein the identified position is provided to the controller. The flow recording system may further comprise at least one communications interface for communicating with systems external to the fire appliance wherein the controller is configured to provide the obtained measurements to an external system via the communications interface.

In a further embodiment a system is provided comprising at least one fire appliance of the type provided by the second embodiment. In this third embodiment, the system suitably further comprises an external server having a communications interface being configured to receive measurement information from the at least one fire appliance, the server further comprising a database for storing the received measurement information.

The server may be configured to aggregate the information received from several fire appliances together to provide aggregate information on an event.

The aggregated information may be provided to users through a user interface. The aggregated information presented to users may be updated as further measurements are received.

The external server may be configured to aggregate information for multiple flow events to provide an aggregate value for the fire appliance.

The aggregate information may be directed to one of the following: a) pump activity; b) pumped volume; c) pump idling; and d) individual branch usage.

The system may be configured to calculate a tank volume consumption value for the tank of the fire appliance for each flow event.

DESCRIPTION OF DRAWINGS

The present application will now be described with reference to the accompanying drawings in which.

DETAILED DESCRIPTION

The present application allows for information obtained from flow meters to be processed to provide valuable information to the FRS for a number of purposes including: management, training, maintenance indicators, hydrant classification, billing and environmental concerns.

The present application provides a system for the capture of valuable incident data through simultaneous flow data capture, processing of this data, and the presentation of this data in a number of formats to address the problems outlined.

Figure 7:
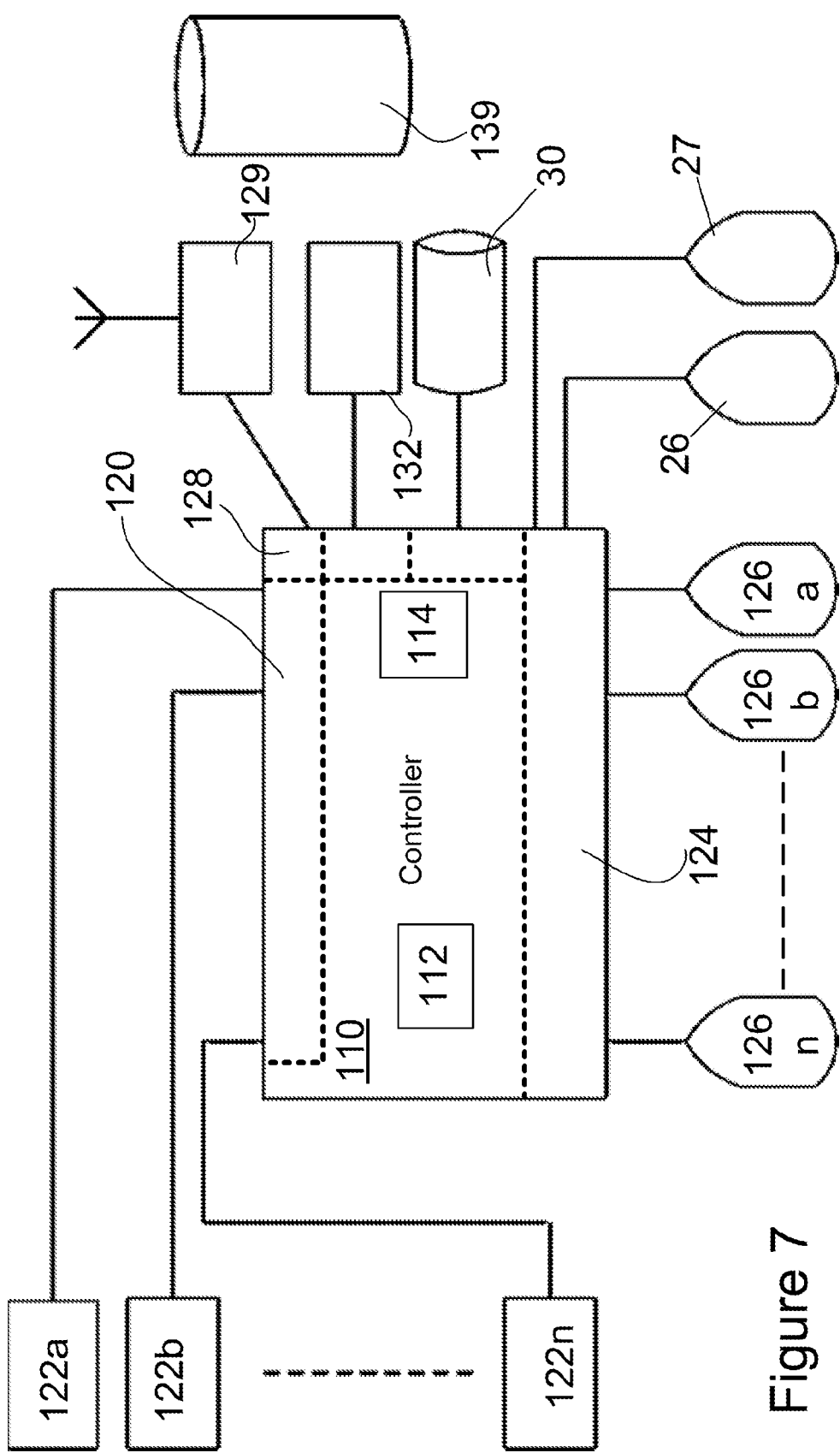
FIG. 7 is an overview of a system employed in a fire appliance according to the present application.

The present application provides a flow recording system 100 for a fire appliance as outlined in schematic form in FIG. 7. The system comprises a controller 110 having a local interface 120 which accepts a number of inputs provided by flow sensors 122a, 122b . . . 122n provided on each fluid inlet and outlet on the fire appliance. The local interface 120 may suitably comprise a plurality of serial communications inputs.

The controller 110 is suitably provided within a housing having a plurality of terminals for making a connection to the controller 110. Suitably, the housing is configured to be a standard housing in which each of the terminals corresponds to a predefined input. Thus, for example, there may be terminals\inputs provided on the housing for making connections to the controller 110 from three low pressure outputs, three medium pressure outputs and three high pressure outputs. Thus depending on the configuration of the fire appliance, different connections to the system may be connected without necessarily requiring a re-coding of the software. Similar connections and serial communications inputs may be provided for sensors which measure the flow of incoming fluid to the appliance. Thus, for example, the controller housing may have terminals therein for connection to the sensor on a valve for connection to a hydrant and a separate connection for connection to an alternate supply, e.g.: from a lake or reservoir.

The controller 110 may have a plurality of associated switches (not shown), for example DIP switches, provided within the housing, which may be set to provide a code uniquely identifying the fire appliance on which the controller is situated.

Figure 1:
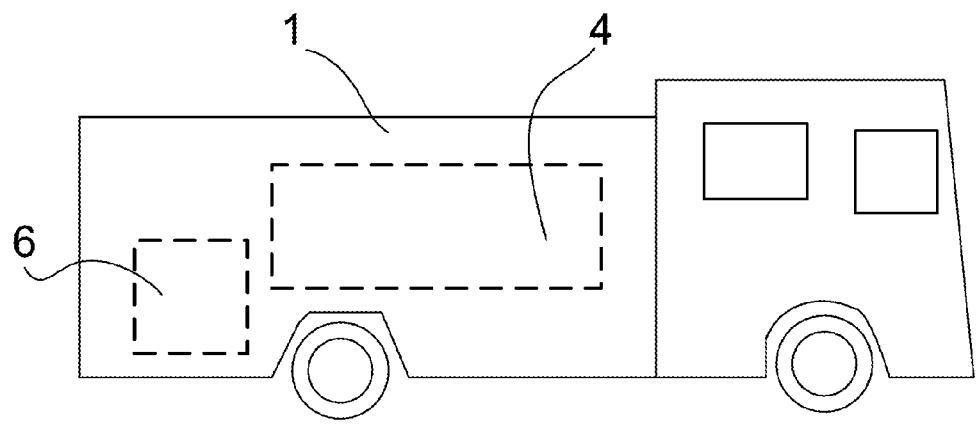
FIG. 1 is an exemplary representation of a fire appliance known in the art.
Figure 2:
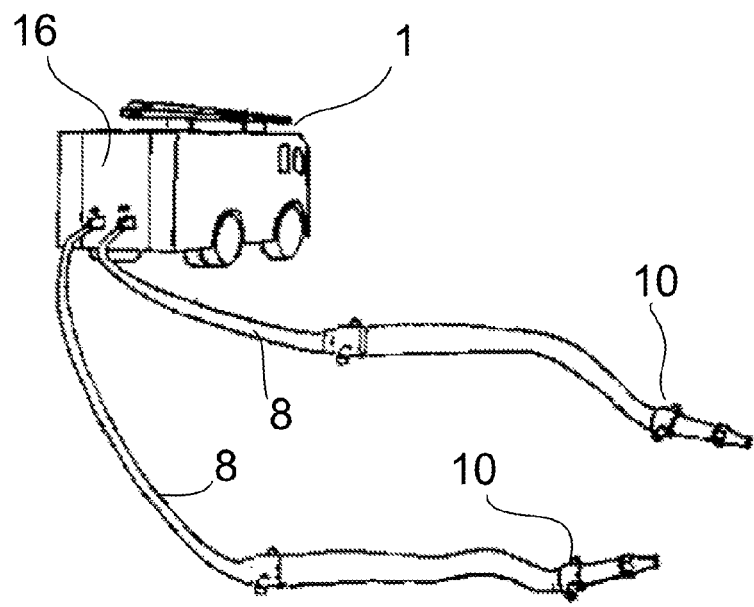
FIG. 2 is a fire appliance of the type generally shown in FIG. 1 showing hose and branch connections.
Figure 3:
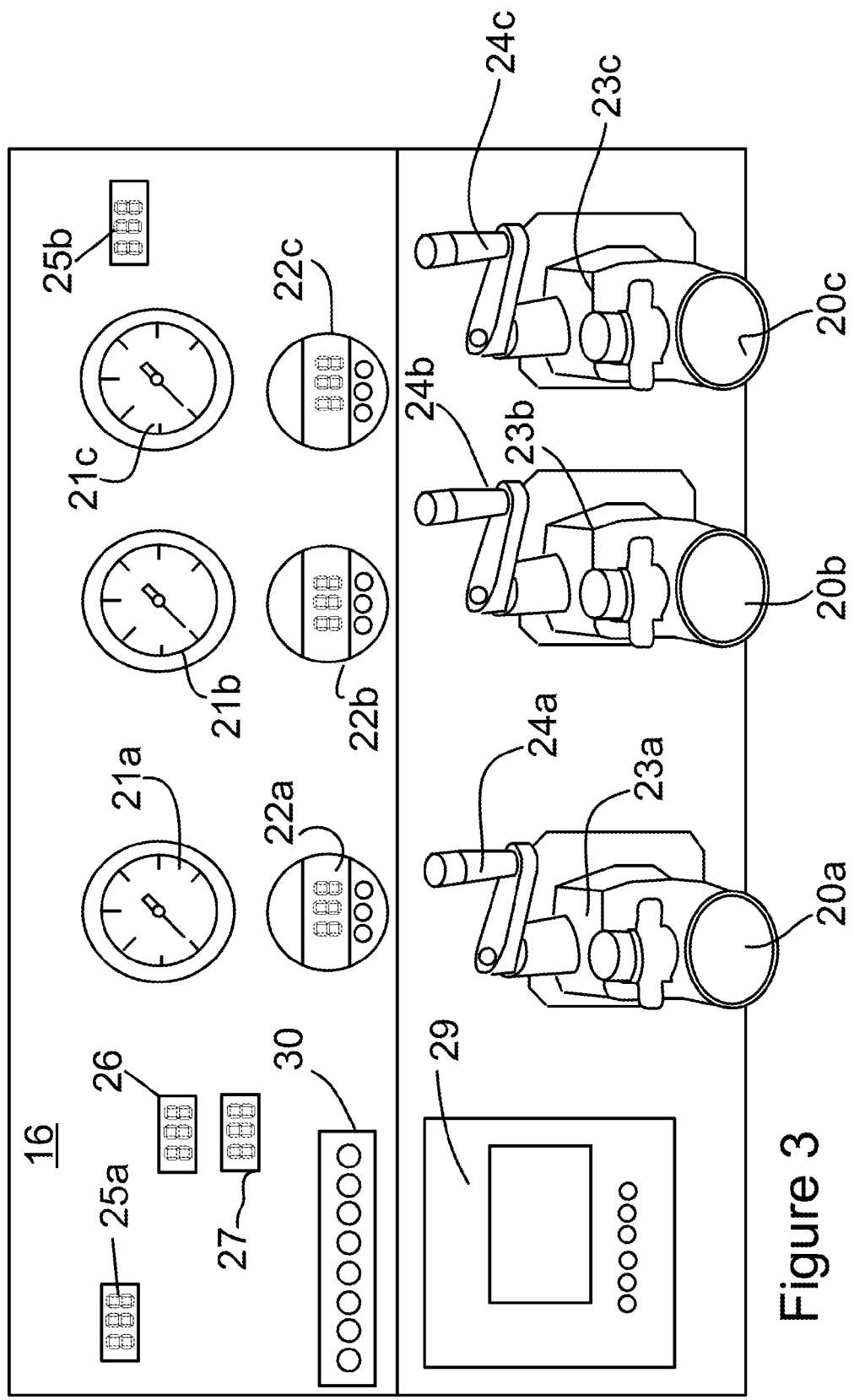
FIG. 3 is an illustration of a flow metered pump bay as employed in the present application.

Suitably, the flow sensors 122a-n are electromagnetic sensors as these do not interrupt fluid flow. However, other flow sensors may also be used. Pressure sensors (not shown) may also be provided for providing a measurement for the pressure of each inlet and outlet. The pressure sensors may be connected to the controller 110 using the same type of connections employed for the flow meters. In one arrangement, each of the pressure\flow sensors also provides a measurement directly to a corresponding display device in the pump bay as shown in FIG. 3. In another arrangement, the controller 110 accepts the measurement from each of the pressure\flow sensors and in turn, through an output interface 124, drives one or more display devices 126a-n, for example an LCD or LED display device. The advantage of the first configuration is that the displays will continue to display values notwithstanding the failure of the system. The advantage of the second configuration is that the display may be altered to indicate the detection of a dangerous condition, e.g.: by causing the display to flash. An example of a pump bay 16 employed by the system of the present application is shown in FIG. 3, depicting a number of low pressure deliveries 20a-c, including their respective pressure 21a-c and flow gauges 22a-c, which depending on the configuration may correspond to display devices 126a-n. Additionally the flow gauges for the high pressure delivery lines are also displayed. As sensors cannot easily be installed after the flow delivery valves 23a-c, the pressure and flow sensors are suitably installed prior to the flow delivery valves 23a-c. Thus when the valve is closed, the pressure gauges indicate the developed pump pressure, while the flow meters show zero flow. The flow delivery valves 23*a-c* are typically operated by handles 24*a-c*. Other displays may be employed to display other values, thus for example a display 25*a* may be provided to display a high pressure flow readout with another display 25*b* providing a readout of pressure of the high pressure connection. An advantage of the present system is that displays 26,27 may also be provided to show aggregated flows, for example the total flows into and out of the appliance may be shown. As with a conventional pump bay, an engine speed control 29 may be provided allowing the operator to monitor and control engine speed. Warning lights 30 may be provided as outputs from the controller to indicate problems to the operator. To assist the operator, each display should be clearly labelled or otherwise identified.

In addition to measurements from flow sensors, the controller suitably also accepts a number of other inputs from other sensors. In particular, a pump status signal may also be provided as an input (not shown) through an interface, for example interface 120. This signal may for example be directly provided from the switch which is operated to engage the pump, i.e.: to identify when the pump is switched on or off. The signal may also be from a sensor detecting the speed of operation of the pump. Other signals provided to the controller may include status signals or alarm signals from other devices on the fire appliance. Such a signal may include for example, a signal identifying whether foam is being deployed, typically the deployment of foam is made by pressing a switch, the detected state of this switch may be employed to identify the use of foam, which in turn may be stored in a flow record. The controller may also provide a connection through a communications interface 128 to a communications device 129, for example a data (e.g.: GPRS) modem. The controller 110 may also accept an input from a GPS device indicating the position of the fire appliance.

Thus the flow meters for associated pipe work on a fire appliance may be connected to the flow measurement system with meaningful identifiers including: low pressure deliveries (LP), high pressure deliveries (HP), hydrant to pump inlets, hydrant to tank inlets, eye of pump intake and other configurations encountered in such appliances. By having a plurality of inputs provided on the housing of the flow measurement system, different configurations may be provided without having to customize the software in each fire appliance to identify inputs. Alternatively, each system may be configured during installation, e.g.: by storing the configuration in memory of the controller. In either event, these configurations are adjustable to match the type of pump which defines the number of deliveries and outlets. Pressure sensors may also be incorporated to measure the pressure in each line. It will be appreciated that not all water access\egress points need to be monitored, and in special cases the system may reconstruct the missing flow sensor readings by appropriate addition and subtraction of inlet and outlet flows.

The controller 110 suitably comprises a microprocessor 112, microcontroller or similar device with associated memory 114 for storing program code and data.

During operation of the controller 110, flow readings are acquired continuously by the controller via the local interfaces, for example every 1 sec.

As discussed, the controller 110 may also be connected to a GPS device 132 from which the position of the fire appliance may be determined. The controller 110 further comprises a communications devices interface connected to one or more communications devices so as to allow for communication with devices remote from the fire appliance. The communications device and GPS device may be integrated together for example in the form of a standard GPRS/GPS modem. Suitably, the controller also has a local clock from which it may determine the local time. The local time may for example be obtained from the GPS device.

This system provides local functionality (display information) to the user of total flows in and out of the appliance, local volume display and the identification of alarm conditions such as 'over-run' of supply where delivery of water exceeds incoming supply for too long.

Figure 4:
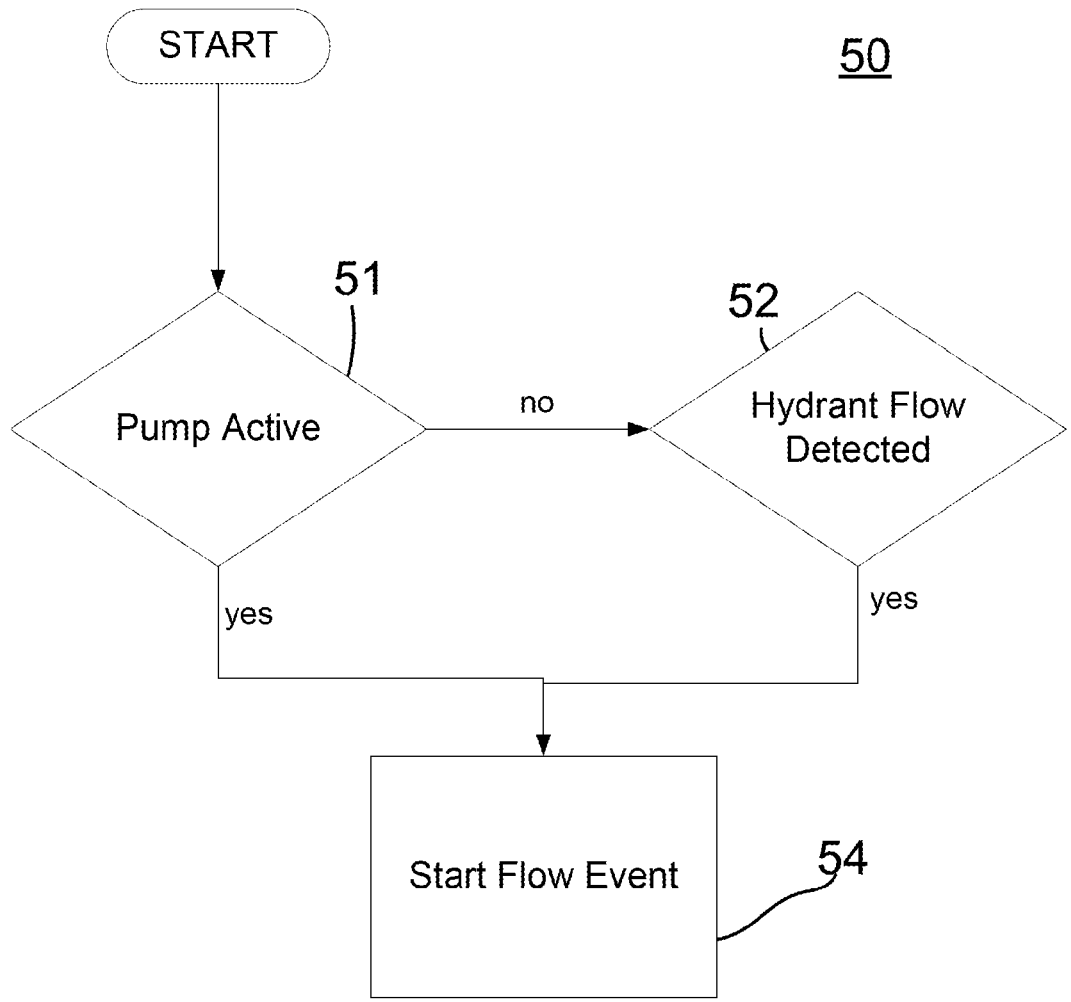
FIG. 4 is a flow chart of a method according to one aspect of the present application.

The system runs software that captures all flow meter activity, and based on a number of operating conditions this is stored in local memory, using a suitable memory mapping to uniquely identify events relating to flow. These are called Flow Events (FE). Incidents are defined as one or more flow events. As shown in the process flow 50 of FIG. 4, flow events may be initiated 54 upon the detection of one of a plurality of conditions 51, 52. These conditions may for example be any of: Pump activity through detected PTO activity or flow on inlets that bypass the pump or do not rely on its activity, such as a hydrant inlet, wherein the distribution pressure is sufficient to fill the appliance tank. Flow events are ended when a start condition is no longer present. Not more than one flow event can be active on an appliance at any one time. Numerous flow events can be recorded to the limit of memory available. A flow event counter is maintained on the controller with each flow event taking a successive value from the counter. This is used to uniquely distinguish between separate flow events.

A flow event combines a selection of data to aid further processing. These include the data and time when the event commenced, the GPS coordinates of the vehicle are recorded at fixed intervals during the event and the emergency lighting or warnings status.

Figure 5:
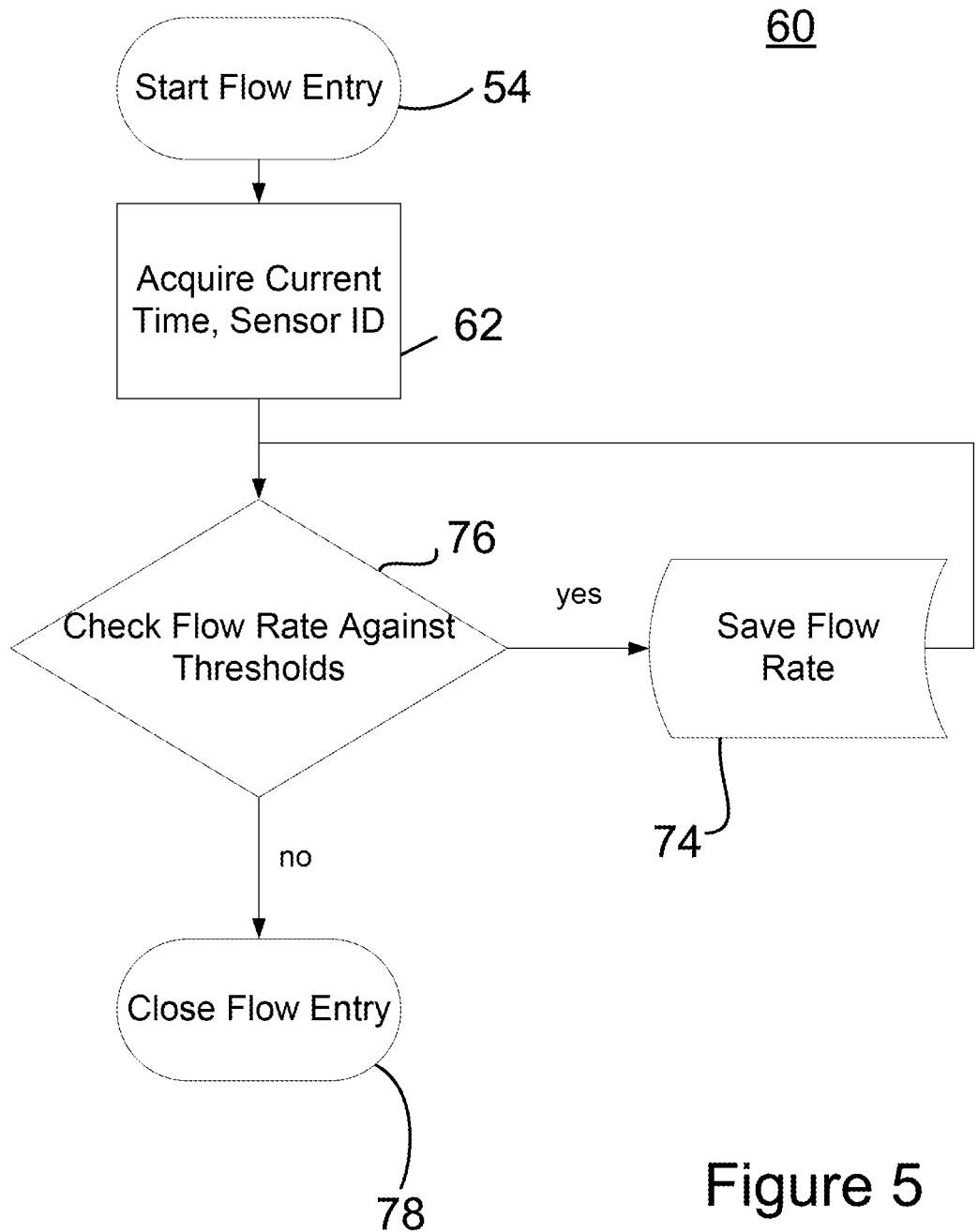
FIG. 5 is a flow chart of a method according to another aspect of the present application.
Figure 6:
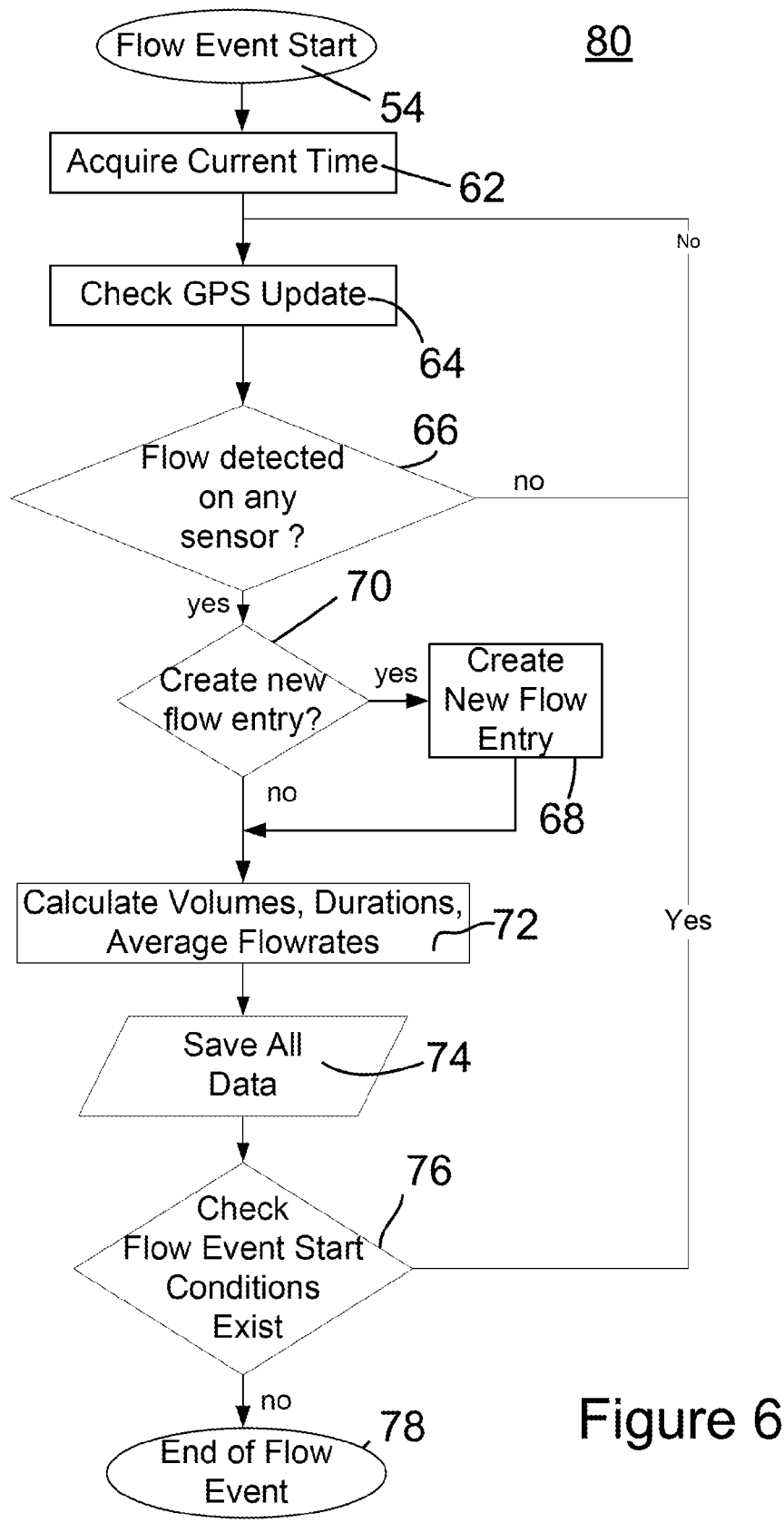
FIG. 6 is a more detailed flow chart of the process of FIG. 5.

As shown in the process flow 60 in FIG. 5, once an event start condition has been detected 54, the current time is recorded 62 as the flow event start time. Referring to the more detailed process flow 80 in FIG. 6, the GPS co-ordinates of the vehicle are also obtained 64 and periodically recorded during a flow event. The flow rate of an individual sensor is compared 66 with a predefined threshold and when the threshold is exceeded a flow record for the identified sensor is created 68 saving the flow rate and start time. In greater detail, and with reference to more detailed process flow 80 of FIG. 6, all flow sensors readings are monitored. If flow is registered and satisfies settable thresholds on flow level and persistence (based on time delay) a flow entry is made in the event. This flow entry is recorded with the date and time when the flow conditions were satisfied, pipe work identification and continuous recording of flow levels on a fixed (settable) interval typically 1 second. A flow entry is closed 78 when a determination 76 is made that the monitored flow reading falls below a second preset flow level for a persistent duration of time. Multiple flow entries from different sensors may be active simultaneously. During a flow event multiple flow entries can be made from the same sensor source. For example, consider the case of where a branch is switched off whilst the fire fighter repositions to attack the fire from a different position. The fire appliance pump will still be running in such a situation and may still be delivering water to another branch and so whilst the flow entry may end for one branch, a separate flow entry may continue for another. Where a flow is detected on a sensor, a determination 70 is made that there is no existing flow record active for that sensor before creating a new flow entry.

During a flow event, volumes 72 for each connected sensor are calculated using simple integration based on the system sampling rate and the individual sensor flow rate measurements. The volume calculations are suitably continuously stored 74 in memory. Volume calculations need only be applied when flow entries are occurring. A tank consumption volume may also be generated by summing the delivered water volumes before an inlet source became active. It will be appreciated that whilst the tank consumption volume may be measured, the remaining tank volume may be unreliable as the initial tank volume may be unknown. All volumes are reset at the start of each flow event.

As with other sensors, the average flow rate from the hydrant sensor pipe work is calculated during a hydrant flow entry and is stored in the flow event. The total event time and a unique appliance identifier are recorded.

In certain situations, there may be periods during a flow event when there is no flow. For example, a flow event may be initiated by detection of engagement of the pump. However, it is common for the pump to be engaged and running whilst the branch valves remain closed, e.g.: as braches are connected and carried to the fire. Thus whilst it may appear counter intuitive a zero flow entry may be recorded in an event whilst such a condition remains. This may be employed to estimate the overall time a pump is running for preventative maintenance purposes or for analyzing an incident afterwards where the time the pump was running with zero flow would indicate the length of time before branches were deployed to combat a fire.

A number of interfaces are available for the recovery of stored flow events. Local connectivity may be provided via, for example, a USB connection to allow a portable computer running appropriate decoding and display software to recover the information. This data is presented in a structured manner from summary information including water volumes, times etc. to individual flow entry plots. Additional functionality is provided to upload the data to an incident database.

Referring to FIG. 7, a facility is also provided to transfer to a local vehicle CPU via a defined serial transfer protocol or otherwise, for subsequent upload of data to an associated external incident database 139 though the vehicle communication systems. A wireless data upload function through a GPRS modem or otherwise is provided, wherein data is transferred to the associated incident database. This later transfer method is closely integrated with the microprocessor. Post flow event data collection and removal is facilitated as before, with the addition of a live flow event transfer. The modem may be programmed to collect data on a recurring basis (settable with 30s typical) storing the data locally in the modem memory. This is subsequently transferred to the database where the appropriate allocations and references are maintained.

Data is transferred to the external incident database 139 via one of the previously defined means, preferably using the communications device, e.g.: GPRS modem, with provision for a unique identifier. This can be sourced from the modem ID such as its IMIE number or appliance identifier. The database assigns the appliance call sign to the data at this point. The fire service details are entered including station lists and appliance station assignments. Access points can also be provided in FRS databases to identify call outs, etc.

The database may be designed to interpret multiple flow events from multiple installations and to apply a range of processes to this data. Automatic Incident identification is performed by the database to segment the acquired flow events into Incidents. This process operates using the fusion of GPS location, data and time stamps and volumes delivered and acquired. Additional supervision input is possible from the FRS, and access to the FRS call out database can also be facilitated. Discrimination between training runs and live runs may also be determined based on the location and the emergency lighting and warning data.

The database suitably computes a range of high level data to give the overall water usage volumes by fire service; typically annually, monthly, by volume of water used and historically. Water usage volumes and information can be filtered to give station summaries, appliance summaries and call-sign summaries (the call signs may be pre-programmed into the flow measurement system or associated with them by virtue of the preset identifier). More detailed flow event data is viewable on individual or combinations of selectable filters including: per station, per appliance registration number, per water volumes delivered, per unique identifier and per date of flow events. At a lower level individual flow event data summaries are available over a communications link, such as the previously discussed GPRS connection. At the most fundamental level graphs of flow of individual flow entries are available.

The advantage of these features is that accurate volume information is available post-incident for billing, cleanup and foam concentration in the environment. They assist in the review of fire-fighting practices in the field for health and safety concerns and assist in identifying further training. Together with the GPS coordinates usage patterns may be established over time to identify heavy usage areas so as to inform resource decisions. Using the tank volume sum, an indication of the reliance on tank volume may similarly be established over time. Using a number of references, such as station, appliance or GPS location this data is presented to give an indication to the reliance on tank water. This information may assist the FRS in assessing the tank usage patterns in order to adjust the amount of water being carried around, and to assist in decisions for new appliance builds, i.e.: what is the optimum tank size required in a particular environment.

Per appliance calculations may also be computed based on flow event durations and volumes to provide a pump usage gauge to inform fleet maintenance. Special case routines may also be employed by the database software to identify conditions where the tank volume was delivered without using additional inlets or insufficient inlet water, based on the outlet water. These potential dry pumping cases are flagged and reports are automatically generated to inform the designated department. This is useful for preventative maintenance routines as dry pumping incidents are significant causes of pump failure and reporting of them may be unreliable.

Another issue that may be addressed by the present application is that FRS generally maintain a database of fire hydrants throughout their particular territory. The hydrants are typically examined on an individual basis on a rolling schedule. This information is required to identify the volume of water that is available for fire-fighting. However, each time a fire appliance utilises a fire hydrant, this snapshot of capacity is discarded. The present application provides a means of recovering this information to inform the FRS hydrant database. This has advantages of identifying impaired hydrant capacity at an early stage. Thus using the GPS coordinates recorded by a fire appliance for an incident and given access to the FRS hydrant database, a distance limited nearest neighbor search is performed to identify the hydrant that was employed. The latest hydrant state is updated based on the measurements recorded during the incident and a check is performed to identify irregular changes in capacity. As before, these reports may be automatically generated for further investigation.

An additional component of the database functionality is designed to give live feedback of flow and volume conditions for multiple appliances to a control unit or incident command unit. Utilizing the GPRS connection, a facility is engineered whereby currently ongoing flow event data is transferred to the database. This database component allows the incident command unit to add appliances to an active list by appliance call sign, registration or through an analysis of the current GPS locations. Once this step is completed, the incident commander is presented with an overall view of the incident progress, with the total flows in and out of all appliances displayed including volumes, hydrant capacities and the various other features already outlined.

Automatic grouping of flow events from one or more fire appliances may be performed on the data on the server using a variety of different techniques. In a first example, the database may retrieve call-out records for an incident from a call-out database maintained by the FRS. Such databases generally contain details of the start time of an incident, the end time of an incident and the call signs of appliances attending. By retrieving such records from the call-out database, flow events may readily be grouped into an incident by analyzing flow events for start times that fall within the start and end time of an incident from the call-out database and for appliances with matching call signs.

Similarly, flow events may be grouped into an incident or otherwise classified based on other parameters including for example GPS co-ordinates. Thus for example an incident may be identified by the proximity of position and times of flow events. Similarly, an incident may be identified as a training exercise where the GPS co-ordinates are within those identifying a pre-identified training site, which would be employed by the FRS for training purposes.

Lastly, a range of automatic and user initiated reports may be made available to the FRS. These include report generation per fire station, by water usage per appliance water usage per call-sign up to partial and full flow events and incidents. The reports are suitably made available through a range of media formats.

For example, an accurate measure of the volume of water delivered at an incident where there has been a chemical spillage is important so that the correct dilution of the chemical concerned can be achieved. Similarly, if containment and clean up is required, or where chemical foam is utilised, relevant departments would be at an advantage knowing water volumes dispensed so as to arrange resources to effect the clean up. Similarly, as FRS's utilise treated water from the distribution network, there is an associated cost with its consumption. By having an accurate measure of the volumes involved, it is possibly to reliably bill the 'customer' for this water. Additionally, by having volume usage patterns available, the FRS can predict water requirements at particular incidents and across the territory in order to target resources to areas of high usage and ensure availability of water at particular districts. In the longer term, they may be used to identify appropriate appliance tank capacity for new builds to increase efficiency.

Fleet managers and maintenance departments with responsibility for pump maintenance frequently encounter damage to pumps due to their operation without water in the casing. This occurs when the tank is empty and there is no or insufficient inlet supply. It causes an increase in temperature which leads to pump failure. By monitoring the incoming and delivery flow rates, the impending shortfall in water may be identified and alarms raised to alert the pump operator who can then take action to correct the situation. However fire crew reporting of pump abuse may be unreliable, the present system provides an automated means of identifying these occurrences on a post incident basis. Through these means, fleet management can take appropriate remedial action to avoid pump damage. In a similar vein, an indicator of pump usage is also required to inform maintenance schedules. The advantage of the present system is that it goes beyond mere monitoring of PTO activity which is insufficient as is does not indicate the usage of ancillary fire fighting equipment such as hoses, branches and valves. Thus by recording information as flow records within one or more flow events for a fire appliance occurring in incidents over time, it is possible for a report to be generated indicating for example the total amount of time a pump on a fire appliance has been run since a particular date, e.g.: the last maintenance, or the aggregate volume of liquid that has pumped by a pump since the last maintenance. This pump running time may be broken down further into active time when water is actually being pumped and idling time where it is engaged but the branch valves are closed. In addition information may be obtained as to which branches are used and how often. This information in turn may be used to drive a preventative maintenance program or to inform future specification of fire appliance based on past history of usage.

Similarly reports may be generated to summarise the amount of time spent on training runs, which in turn may also be identified by the non-running of emergency lights on the Fire Appliance as emergency lighting is generally not used during training exercises or by reference to the GPS co-ordinates as previously described.

Additionally, the external server may be integrated with a billing system. In this scenario, the server may generate a charge to the billing system based on a water consumption value determined for an incident.

Post incident analysis is generally often conducted afterwards for the purposes of training, health and safety, and after injuries or fatalities occur. The present system provides significant advantages over the prior art for these investigations as it provides a complete picture of water usage during a particular incident and allows for its presentation in a meaningful manner.

A number of automated identifiers may be used to assist in these situations including: identification of branch damage due to cuts or restrictions from falling debris, e.g.: where there is an unexpected change in the measured flow for a particular pressure.

As outlined previously, flow meter equipped appliances generally offer many benefits to the pump controller, local incident commander and branchmen. However in the case of a large fire involving several fire appliances, this water usage and supply information is not readily available to the incident commander other than by verbal reports from pump operators. The present system addresses this by each fire appliance having a means of communicating the water application of multiple appliances to one centralized location, (typically an incident command unit). Once the information is communicated, quantifiable information is then available to the operational incident commander (OIC) informing him of how much water resource are available for deployment along with information about the volumes of water already used.

It will be appreciated that the presently described system offers significant advantages over current technology and practices. For example, it removes responsibility for information gathering from the pump operator whose primary attention should be directed to fire-fighting objectives.

The present application extends to a fire appliance vehicle having a flow recording system, a flow recording system and method of recording flows as described herein.

The invention claimed is:

1. A fire appliance vehicle comprising at least one pump for delivering a fluid from a pump bay to a fire, the fire appliance further comprising a flow recording system, the flow recording system comprising:
   a controller having at least one local interface to communicatively interface with devices locally on the fire appliance;
   at least one flow meter to measure a flow of water being delivered to an individual outlet of the fire appliance, the flow meter being configured to provide flow information to the controller via the at least one local interface; and
   at least one communications interface for communicating with at least one external system external to the fire appliance wherein
      the controller is configured to obtain a measurement from the at least one flow meter from time to time, and to store the at least one measurement and the time of the measurement and
      the controller is further configured to provide the stored measurements and times of measurements to the at least one external system via the communications interface.

2. A fire appliance vehicle according to claim 1, wherein the controller is configured to estimate a volume of fluid delivered past the at least one flow meter by integrating a number of measured flow rates over a number of respective time intervals between measurements.

3. A fire appliance vehicle according to claim 1, further comprising at least one sensor wherein the controller is responsive to a detection of one or more events from the at least one sensor to initiate the storing of the at least one measurement.

4. A fire appliance vehicle according to claim 3, further comprising a display for displaying measured flow information to a pump operator.

5. A fire appliance vehicle according to claim 1, wherein the controller is configured to detect a predetermined condition and to cause an alarm to be presented to a pump operator on the occurrence of said predetermined condition.

6. A fire appliance vehicle according to claim 1, further comprising a positioning system that identifies a geographical position of the fire appliance vehicle, wherein the identified geographical position is provided to the controller.

7. A system comprising:
   a fire appliance vehicle comprising at least one pump for delivering a fluid from a pump bay to a fire, the fire appliance further comprising a flow recording system, the flow recording system comprising:
      a controller having at least one local interface to communicatively interface with devices locally on the fire appliance;
      at least one flow meter to measure a flow of water being delivered to an individual outlet of the fire appliance, the flow meter being configured to provide flow information to the controller via the at least one local interface; and
      at least one communications interface for communicating with at least one external system external to the fire appliance wherein
         the controller is configured to obtain a measurement from the at least one flow meter from time to time, and to store the at least one measurement and the time of the measurement and
         the controller is further configured to provide the stored measurements and times of measurements to the at least one external system via the communications interface and
   a first external system of the at least one external system external to the fire appliance, the first external system comprising an external server comprising a database to store the received measurement information, including both measurements of flow and corresponding times for the measurements of flow.

8. A system according to claim 7, wherein the server is configured to aggregate the information received from the fire appliance and several additional fire appliances together to provide aggregate information on an event.

9. A system according to claim 8, wherein the aggregated information is provided to users through a user interface.

10. A system according to claim 9, wherein the aggregated information presented to users is updated as further measurements are received.

11. A system according to claim 7, wherein the external server is configured to aggregate information for multiple flow events to provide an aggregate value for the fire appliance.

12. A system according to claim 11, wherein the aggregated information is directed to at least one of:
   a pump activity;
   a pumped volume;
   a pump idling; or
   an individual branch usage.

* * * * *